US011429986B2

(12) United States Patent
Russo et al.

(10) Patent No.: US 11,429,986 B2
(45) Date of Patent: Aug. 30, 2022

(54) REALTIME BUSYNESS FOR PLACES

(71) Applicant: Google LLC, Mountain View, CA (US)

(72) Inventors: Frank Russo, Sunnyvale, CA (US); Luuk Van Dijk, Zürich (CH); Paul Donnelly, San Jose, CA (US); Quang Duong, San Francisco, CA (US); James Aspinall, San Francisco, CA (US); Finnegan Southey, San Francisco, CA (US); Steve Chien, San Carlos, CA (US)

(73) Assignee: Google LLC, Mountain View, CA (US)

( * ) Notice: Subject to any disclaimer, the term of this patent is extended or adjusted under 35 U.S.C. 154(b) by 127 days.

(21) Appl. No.: 16/346,372

(22) PCT Filed: Nov. 4, 2016

(86) PCT No.: PCT/US2016/060572
§ 371 (c)(1),
(2) Date: Apr. 30, 2019

(87) PCT Pub. No.: WO2018/084851
PCT Pub. Date: May 11, 2018

(65) Prior Publication Data
US 2020/0058039 A1     Feb. 20, 2020

(51) Int. Cl.
*G06Q 10/00* (2012.01)
*G06Q 30/02* (2012.01)
*G06F 16/22* (2019.01)

(52) U.S. Cl.
CPC ..... *G06Q 30/0201* (2013.01); *G06F 16/2255* (2019.01)

(58) Field of Classification Search
None
See application file for complete search history.

(56) References Cited

U.S. PATENT DOCUMENTS 7,136,861 B1 *  11/2006  Sinclair ............... G06F 16/2255
7,590,620 B1 *   9/2009  Pike .................... G06F 11/1482
(Continued)

OTHER PUBLICATIONS

Iwan Briquemont et al. (Optimising Client-side Geo-replication with Partially Replicated Data Structures, Thesis submitted for the Master's degree in computer science, Academic year 2013-2014). (Year: 2013).*
(Continued)

*Primary Examiner* — Hafiz A Kassim
(74) *Attorney, Agent, or Firm* — Lerner, David, Littenberg, Krumholz & Mentlik, LLP

(57) ABSTRACT

Real-time busyness information is for a public place is computed in a privacy-sensitive way, and provided for display in relation to historical busyness information. An aggregate amount of real-time location information available for a particular public place is measured (410), and used to determine (420) whether the public place is privacy-qualified. If the public place is privacy-qualified, real-time busyness information is computed (440) for the public place based on the real-time location information. Further, it is determined (450) whether the computed real-time busyness information is accuracy-qualified, based on a comparison of the real-time busyness information to historical busyness information. If both qualifications are met, the real-time busyness information is output (470) for display or to another application.

19 Claims, 8 Drawing Sheets

(56) References Cited

U.S. PATENT DOCUMENTS

| | | | | |
|---|---|---|---|---|
| 7,600,125 | B1* | 10/2009 | Stringham | G06F 11/1004 380/229 |
| 7,912,629 | B2* | 3/2011 | Sutter | G08G 1/0104 701/118 |
| 8,369,867 | B2* | 2/2013 | Van Os | H04L 67/18 455/456.1 |
| 8,510,807 | B1* | 8/2013 | Elazary | H04L 12/42 726/4 |
| 8,600,360 | B1* | 12/2013 | Patvarczki | H04L 67/24 455/414.3 |
| 8,775,941 | B1* | 7/2014 | Deshpande | H04L 67/02 715/736 |
| 9,066,315 | B2* | 6/2015 | Shimo | H04W 4/21 |
| 9,160,727 | B1* | 10/2015 | Saylor | H04L 63/08 |
| 9,883,324 | B2* | 1/2018 | Selen | H04W 4/80 |
| 10,531,226 | B1* | 1/2020 | Wang | G06Q 30/0201 |
| 2003/0078055 | A1* | 4/2003 | Smith | H04Q 7/20 455/456 |
| 2004/0088293 | A1* | 4/2004 | Daggett | G06F 7/00 707/6 |
| 2006/0242154 | A1* | 10/2006 | Rawat | G06F 16/168 |
| 2007/0264974 | A1* | 11/2007 | Frank | H04M 3/4878 455/411 |
| 2008/0248815 | A1* | 10/2008 | Busch | G06Q 30/0255 455/456.5 |
| 2009/0112795 | A1* | 4/2009 | Abraham | G06F 16/2462 |
| 2009/0313208 | A1* | 12/2009 | Helfman | G06F 16/2255 |
| 2009/0325603 | A1* | 12/2009 | Van Os | H04W 4/029 455/456.2 |
| 2010/0070514 | A1* | 3/2010 | Woodruff | G06F 16/958 707/754 |
| 2010/0158488 | A1* | 6/2010 | Roberts | G06F 16/634 386/334 |
| 2010/0217480 | A1* | 8/2010 | Link, II | G06F 16/41 701/31.4 |
| 2010/0250369 | A1* | 9/2010 | Peterson | G06F 16/29 705/14.58 |
| 2011/0161119 | A1* | 6/2011 | Collins | G06Q 40/08 705/4 |
| 2011/0276440 | A1* | 11/2011 | Collins | G06Q 10/06 705/28 |
| 2012/0078970 | A1* | 3/2012 | Matsakis | G06F 16/2255 707/800 |
| 2012/0150586 | A1* | 6/2012 | Harper | G06Q 30/0204 705/7.33 |
| 2013/0021949 | A1* | 1/2013 | Kaal | H04L 12/5691 370/255 |
| 2013/0132484 | A1* | 5/2013 | Berezecki | H04L 61/6022 709/205 |
| 2013/0266195 | A1* | 10/2013 | Shiell | G06K 9/621 382/118 |
| 2014/0089024 | A1* | 3/2014 | Mason | G06Q 10/06 705/7.12 |
| 2014/0130140 | A1* | 5/2014 | Abhyanker | G06Q 10/087 726/4 |
| 2014/0153721 | A1* | 6/2014 | Malone | H04L 9/3249 380/259 |
| 2014/0164111 | A1* | 6/2014 | Rodriguez | G06Q 30/0255 705/14.53 |
| 2014/0172852 | A1* | 6/2014 | Kay | H04L 41/142 707/736 |
| 2014/0236684 | A1* | 8/2014 | Nozawa | G07B 15/02 705/13 |
| 2014/0274022 | A1* | 9/2014 | Bell | G06F 16/951 455/418 |
| 2014/0310162 | A1* | 10/2014 | Collins | G06F 16/29 705/39 |
| 2014/0365459 | A1* | 12/2014 | Clark | G06F 7/26 707/709 |
| 2015/0082459 | A1* | 3/2015 | Kelly | H04W 12/08 726/28 |
| 2015/0089621 | A1* | 3/2015 | Khalid | H04L 63/0807 726/9 |
| 2015/0120706 | A1* | 4/2015 | Hoffman | G06N 3/0445 707/722 |
| 2015/0142807 | A1* | 5/2015 | Hofmann | G06F 16/245 707/737 |
| 2015/0161207 | A1* | 6/2015 | Li | G06F 16/951 707/747 |
| 2015/0249904 | A1* | 9/2015 | Weiss | H04W 4/027 455/456.1 |
| 2015/0324891 | A1* | 11/2015 | Tapley | G06Q 30/0639 705/26.8 |
| 2015/0350890 | A1* | 12/2015 | Arunkumar | H04W 4/029 455/411 |
| 2016/0019238 | A1* | 1/2016 | Mazniker | G06F 16/9537 707/711 |
| 2016/0021173 | A1* | 1/2016 | Tapia | H04L 67/125 709/204 |
| 2016/0112859 | A1* | 4/2016 | Chen | H04W 76/10 370/338 |
| 2016/0203338 | A1* | 7/2016 | Dabbiru | G06F 16/2365 707/687 |
| 2016/0316332 | A1* | 10/2016 | Bai | H04W 4/029 |
| 2016/0344737 | A1* | 11/2016 | Anton | G06F 21/6218 |
| 2016/0357163 | A1* | 12/2016 | Marti | H04L 12/282 |
| 2017/0116136 | A1* | 4/2017 | MacNicol | G06F 16/2255 |
| 2017/0147621 | A1* | 5/2017 | De Smet | G06F 16/2255 |
| 2018/0069817 | A1* | 3/2018 | Constantinides | H04L 51/20 |
| 2020/0058039 | A1* | 2/2020 | Russo | G06Q 10/04 |

OTHER PUBLICATIONS

Jiajun Liu, Zi Huang, Hong Cheng, Yueguo Chen, Heng Tao Shen, and Yanchun Zhang (Presenting Diverse Location Views with Real-time Near-duplicate Photo Elimination, 978-1-4673-4910-9/13/, IEEE, 2013). (Year: 2013).*

A. Patwardhan, J. Parker, M. Iorga, A. Joshi, T. Karygiannis, Y. Yesha (Threshold-based intrusion detection in ad hoc networks and secure AODV, ScienceDirect, Ad Hoc Networks 6 (2008) 578-599). (Year: 2008).*

Marie Douriez, Harish Doraiswamy, Juliana Freire, and Cl'audio T. Silva (Anonymizing NYC Taxi Data: Does It Matter?, 2016 IEEE International Conference on Data Science and Advanced Analytics). (Year: 2016).*

Christoph Sommer, Ozan K. Tonguz, and Falko Dressier (Adaptive Beaconing for Delay-Sensitive and Congestion-Aware Traffic Information Systems, IEEE, 2010)). (Year: 2010).*

Barkhuus, Louise. "Privacy in Location-Based Services, Concern vs. Coolness." Department of Design and Use of IT, the IT University of Copenhagen. Sep. 2004. (Year: 2004).*

Beresford, Alastair R. et al. "Location Privacy in Pervasive Computing." Published by the IEEE CS and IEEE Communications Society. Jan.-Mar. 2003. pp. 46-55. (Year: 2003).*

43. Yohan Chon and Hojung Cha (LifeMap: A Smartphone-Based Context Provider for Location-Based Services, Published by the IEEE, 2011). (Year: 2011).*

International Preliminary Report on Patentability for International Application No. PCT/US2016/060572 dated May 16, 2019. 10 pages.

Anonymous: "Data anonymization—Wikipedia", Aug. 30, 2016 (Aug. 30, 2016), XP055377366, Retrieved from the Internet: URL: https://en.wikipedia.org/w/index.php?title=Data_anonymization &oldid=736870776. 2 pages.

Anonymous: "Bit array—Wikipedia", Sep. 8, 2016 (Sep. 8, 2016), XP055378557, Retrieved from the Internet: URL: https://en.wikipedia.org/w/index.php?title=Bit_array&oldid=738371255. 7 pages.

Sarah Perez: "Google Search Now Shows You When Local Businesses Are Busiest—TechCrunch", Jul. 28, 2015 (Jul. 28, 2015), XP055335023, Retrieved from the Internet: URL: https://techcrunch.com/2015/07/28/google-search-how-shows-you-when-local-businesses-are-busiest/. 6 pages.

International Search Report and Written Opinion for PCT Application No. PCT/US2016/060572, dated Jun. 13, 2017. 17 pages.

(56) References Cited

OTHER PUBLICATIONS

Examination Report for European Patent Application No. 16806327.9 dated Jun. 18, 2020. 10 pages.
Hash function. Wikipedia. Nov. 19, 2021. 13 pages. Retrieved from the Internet: <https://en.wikipedia.org/w/index.php?title=Hash_function&oldid=745198457>.
Summons to Attend Oral Proceedings for European Patent Application No. 16806327.9 dated Sep. 29, 2021. 12 pages.
Result of Consultation and Preliminary Opinion of lhe Examining Division for European Patent Application No. 16806327.9 dated Apr. 1, 2022. 12 pages.
Brief Communication for European Patent Application No. 16806327.9 dated Apr. 8, 2022. 9 pages.
Minutes of the Oral Proceedings for European Patent Application No. 16806321.9 dated Apr. 12, 2022. 7 pages.

* cited by examiner

| | |
|---|---|
| % visits detected in less than 5 minutes | 25.97% |
| % visits detected in less than 10 minutes | 52.60% |
| % visits detected in less than 20 minutes | 74.29% |
| Number of batches uploaded | 100% |

REALTIME BUSYNESS FOR PLACES

CROSS-REFERENCE TO RELATED APPLICATION

This application is a national phase entry under 35 U.S.C. § 371 of International Application No. PCT/US2016/060572, filed Nov. 4, 2016, the entire disclosure of which is incorporated herein by reference.

BACKGROUND

Some map information may provide an indication of how busy a particular geographic location has historically been. This information is typically averaged over months of visit data. Aggregating over a long period of time enables generation of occupancy distribution histograms for smaller places where non-aggregated data may be too noisy and sparse to be displayed. However, aggregating over such long period of time may also require significant resources, such as memory and bandwidth.

BRIEF SUMMARY

The present disclosure provides for measuring, using one or more processors, an aggregate amount of real-time location information available for a particular public place, determining, with the one or more processors, whether the public place meets a first qualification based at least in part on the amount of available real-time location information, and if the public place meets the first qualification, computing, with the one or more processors, real-time busyness information for the public place based on the real-time location information. Further, it is determined whether the computed real-time busyness information meets a second qualification based on an accuracy of the real-time busyness information, and if the computed real-time busyness information meets the second qualification, the computed real-time busyness information for the particular public place may be provided as output, for example, for display.

Determining whether the public place meets the first qualification may include computing a hash of an identifier, the identifier uniquely assigned to a user at the particular public place, counting a number of unique hashes having location data that, within a predetermined period of time, corresponds to the particular public place, and determining, with the one or more processors, whether a threshold number of unique hashes for the public place are reached within the predetermined period of time. Counting the number of unique hashes may include filling a predetermined portion of a first data structure, such as a bit vector.

Computing the real-time busyness information for the public place may include aggregating the unique hashes within a second data structure, and determining, with the one or more processors, a duration of time during which the unique hashes were aggregated. Moreover, the computing may include emptying the second data structure each time it is filled, and counting a number of times the second data structure is emptied.

Determining whether the computed real-time busyness information meets the second qualification may include comparing, over an evaluation period, the computed real-time busyness information for the public place to historical real-time busyness information for the public place for each hour that the public place was open during the evaluation period. A first number of hours that differ beyond a first threshold is counted, and a second number of hours that

2 match beyond a second threshold is counted. It is determined whether the first number of hours is less than a first predetermined percentage of the total open hours in the evaluation period, and whether the second number of hours is greater than a second predetermined percentage of the total open hours in the evaluation period.

The disclosure further provides a system, comprising a memory and one or more processors in communication with the memory. The one or more processors are configured to measure an aggregate amount of real-time location information available for a particular public place, and determine whether the public place meets a first qualification based on the amount of available real-time location information. If the public place meets the first qualification, real-time busyness information is computed for the public place based on the real-time location information. Further, the one or more processors determine whether the computed real-time busyness information meets a second qualification based on an accuracy of the real-time busyness information, and provide for display, if the computed real-time busyness information meets the second qualification, the computed real-time busyness information for the particular public place.

The disclosure yet further provides a computer-readable storage medium storing instructions executable by one or more processors for performing a method, comprising measuring an aggregate amount of real-time location information available for a particular public place, determining whether the public place meets a first qualification based on the amount of available real-time location information, if the public place meets the first qualification, computing real-time busyness information for the public place based on the real-time location information. Further, the method performed by executing the instructions includes determining whether the computed real-time busyness information meets a second qualification based on an accuracy of the real-time busyness information, and providing for display, if the computed real-time busyness information meets the second qualification, the computed real-time busyness information for the particular public place.

BRIEF DESCRIPTION OF THE DRAWINGS

FIG. 6 illustrates an example of how one or more time periods may be correlated with the aggregation of unique hashes in the second data structure.

DETAILED DESCRIPTION

Overview

Figure 1:
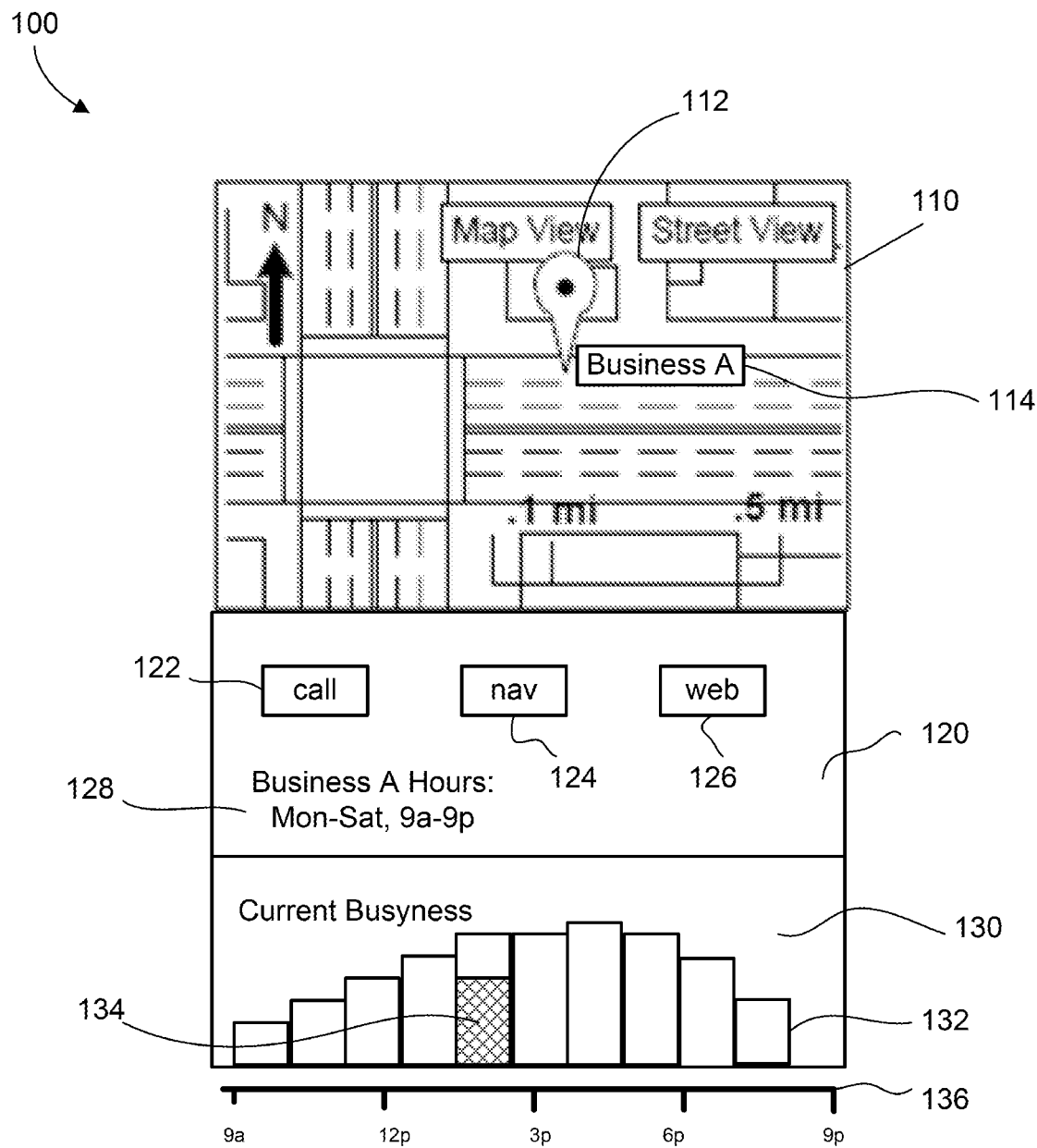
FIG. 1 illustrates an example of how current busyness information may be displayed.

The technology relates generally to measuring and displaying in real-time a level of busyness of a public place. It is determined whether the given public place meets a first qualification with respect to privacy. The first qualification may be based on a variety of conditions, such as types of establishment intended for public visitation, non-sensitive and non-prohibited places, historical visitation rates, historical visit data quality, etc. For example, an available amount of aggregated real-time location information corresponding to a given public place is measured. If an insufficient amount of data is available, the given public place is disqualified and ignored. Ignoring such public places that do not qualify provides increased privacy protection, as well as better quality results. Continuing this example, if sufficient data is available, the given public place meets the first qualification, and real-time busyness information is computed for the given public place based on the aggregated real-time location information. A quality of the computed data is assessed and used to determine whether the given public place meets a second qualification with respect to quality. If the given public place meets both qualifications, a current level of busyness for the given place is provided for display. The current busyness may be provided in relation to historical busyness information for the given public place.

The current busyness information may be provided for display. For example, map information related to the public place ("Business A") is provided, along with other information corresponding to the public place. Examples of such other information include a phone number, directions, website, operating hours, etc. For each of the operating hours, a typical busyness level is shown based on historical data. In addition, the current busyness level may be overlaid on top of the typical levels, thereby giving users a frame of reference.

Example systems used to qualify, compute, and display the current busyness levels may include, for example, one or more processors in communication with one or more databases and mobile devices. For example, raw location information may be provided by mobile devices that have authorized the sending of such information. The location information may include GPS coordinates, signal strength from a particular access point, semantic information such as images of landmarks, or the like. The raw location information may be correlated with a point of interest. For example, GPS coordinates may be correlated with known coordinates of a business. The correlated location information is then used to determine whether a sufficient amount of location information is available for a given location. If so, the quality of such data is verified, and only qualifying information is provided for output.

In an example method for aggregating data and determining if the first qualification is met for the public place, the location information report from a device carries an identifier that distinguishes the reports from different users' devices. A hash function is applied to the report's identifier and the raw identifier is then discarded for the purposes of aggregation. The number of unique hashes are counted, for example, by storing each unique hash in a data structure, such as a vector. Due to collisions in the hash function, the number of unique hashes recorded may be a noisy underestimate of the true number of identifiers observed. Moreover, this data structure retains none of the original location data report identifiers. When a threshold number of unique hashes are stored in the data structure within a predetermined amount of time, the location is qualified as a privacy-qualified place. For example, if 50 unique hashes are stored in the vector within 1.5 days, the location may be marked as a privacy-qualified place. If the location does not qualify, it is regarded as privacy-disqualified and ignored. When the threshold is reached, the data structure is cleared, resetting the count of unique hashes to zero, thus restarting the count. If the threshold is not reached within some maximum period of time, the data structure may be cleared as well, also resetting the count. Each such clearing of the data structure removes all the hashes and thus the only remaining trace of the location data report identifiers that may have contributed to them.

The hash function may be such that it has a high collision rate. For example, a Bloom filter may be used to hash a large set of identifiers down to a small set of discrete values. The cost of observing a location data identifier is therefore low as calculating a hash value and setting a bit is a computationally efficient process. Moreover, by setting the threshold number of hash values to be stored in the predetermined portion of the data structure before meeting the first qualification, the amount of data to be stored at any instant in time is minimized.

Once the public place is qualified from a privacy perspective, real-time busyness may be determined with a finer granularity. In this regard, a second data structure may be used. The second data structure may be a bit vector, similar to the first data structure, with a lesser number of bits. For example, the second data structure may be 10 bits. This second data structure may be used to aggregate the unique hashes. Each time the second data structure is filled, it may be emptied and refilled. An occupancy event may be recorded once the predetermined portion of the data structure is filled, provided all additional privacy and quality requirements have been met. Each such occupancy event represents a noisy underestimate of the true number of identifiers observed.

A period of time corresponding to the filling the second data structure is measured. For example, it may be determined that the second data structure was filled in 5 minutes, or that the second data structure was filled 8 times in one hour.

Hashed information is thus retained in the second data structure for a short amount of time, namely the time until the predetermined portion is full. As described above, resetting the data structure destroys the list of hashes and, with it, any of the short-lived information associated with the location data report identifiers that might have contributed to it. Network traffic is also reduced, since only occurrence of aggregate occupancy events need be communicated to the system components responsible for determining busyness, and not individual location data reports. Reducing the amount of data to be stored in this manner enables the concept to be applied to a wide range of locations.

Before providing the computed real-time busyness information for display, a quality of the computed real-time busyness information is verified. Historical busyness information for a particular location is relatively reliable. The computed real-time busyness information may be compared to the historical busyness information, or historical and realtime busyness plus other signals may be combined in a statistical model to produce a better estimate. For example, an evaluation period, such as a week, a month, etc., may be used. For the length of the evaluation period, the real-time data may be compared with the historical data for each hour that the public place is open. Based on this comparison, some hours may be flagged as "good" hours while others are flagged as "bad" hours. For example, if for a particular hour, the real-time data matched the historical data to a threshold degree, such as above 75% match, that particular hour may be marked as a good hour. Conversely, if real-time data for the particular hour differs from the historical data to a second threshold degree, such as above a 75% difference, that hour may be marked as a bad hour. A number of the good hours and the bad hours are counted. If more than a particular percentage of the total number of hours in the evaluation period are good hours, and less than a second percentage of the total number of hours are bad hours, the real-time data may qualify based on quality. By way of example, if more than 80% of the hours are "good" and less than 5% of the hours are "bad," the real-time data may qualify. Qualified real-time data may be provided for display. However, data that is not qualified may be ignored. For example, data that does not meet the quality threshold is discarded, thereby conserving network and database resources for only locations with quality data. Additionally, a user experience is improved by only receiving reliable information.

The determination of the real-time busyness information is controlled in a manner which preserves privacy of individual location data reports contributing to the aggregate. The determination of the real-time occupancy information is controlled in a manner which ensures that the information displayed at user devices is reliable. The determination of the real-time occupancy information is also controlled in a manner which requires low data storage requirements, processing requirements and network traffic. Furthermore, the determination of the real-time occupancy information is controlled in a manner which avoids unnecessary network traffic and minimizes network disruption. This means that the real-time occupancy information is determined and delivered to user devices in a manner which is efficient in terms of its use of network resources.

Example Systems

FIG. 1 illustrates an example of how the current busyness information may be displayed. In this example, graphic 100 includes a map section 110, an informational section 120, and a busyness section 130. The graphic 100 may be displayed, for example on a client device, in response to a request for information related to Business A. The request for information may include, for example, an address, business name, general geographical area, type of business, etc.

The map section 110 may include a depiction of geographical objects at a particular geographic location. For example, the geographic objects may include roads, buildings, landmarks, statues, street signs, etc. The objects may be depicted in, for example, a roadgraph, aerial imagery, street level imagery, or the like. The map section 110 may also depict a marker 112 corresponding to a requested location, such as Business A. The marker identifies where the requested location is located with respect to other objects depicted in the map section. The marker may be depicted in any of a variety of shapes and forms. Further, a label 114 may identify that the marker 112 corresponds to Business A. Though not shown, in some examples the marker or map near the marker may be depicted so as to indicate real-time busyness of the geographical location. For example, a size, shape, shading, or other aspect of the marker or map may change as the busyness level rises or falls. As another example, additional icons may be positioned on the map near the marker to indicate busyness. It should be understood that these are merely examples, and any of a number of indicators may be used.

Informational section 120 provides further information related to the Business A. Such information may include user input controls 122, 124, 126, enabling the user to take a predetermined action. The predetermined action may be, for example, calling a phone number for the Business A, requesting navigational information to the Business A, or visiting another website such as a site for the Business A. The informational section 120 may also include text 128, such as a listing of the operating hours of the Business A.

The busyness section 130 includes an indication of how busy the requested location is at a current time. In this example, typical levels of busyness are indicated by unshaded bars 132, while the current level of busyness is indicated by shaded bar 134. In this regard, the current busyness is shown in relation to the typical busyness, thereby providing a frame of reference. The current busyness level may be highlighted in any of a number of ways, such as by a graphic effect, such as a blinking light, colors, shapes, etc. A timeline 136 may also be provided for reference, indicating a time corresponding to each bar in the chart. Each bar may correspond to a one hour interval, or to any other interval of time. Moreover, the timeline 136 may correspond to a range of hours that the Business A is in operation.

While a number of example sections are described above in connection with FIG. 1, and the real-time busyness information is shown as being displayed in a bar graph, it should be understood that these are merely examples. The real-time busyness information may be provided for display in any of a number of ways, such as text, pictorial diagrams, charts, graphs, etc. In other examples, the real-time busyness information may be provided to other applications, such as scheduling applications, ride-service applications, games, or any of a variety of other applications.

Figure 2:
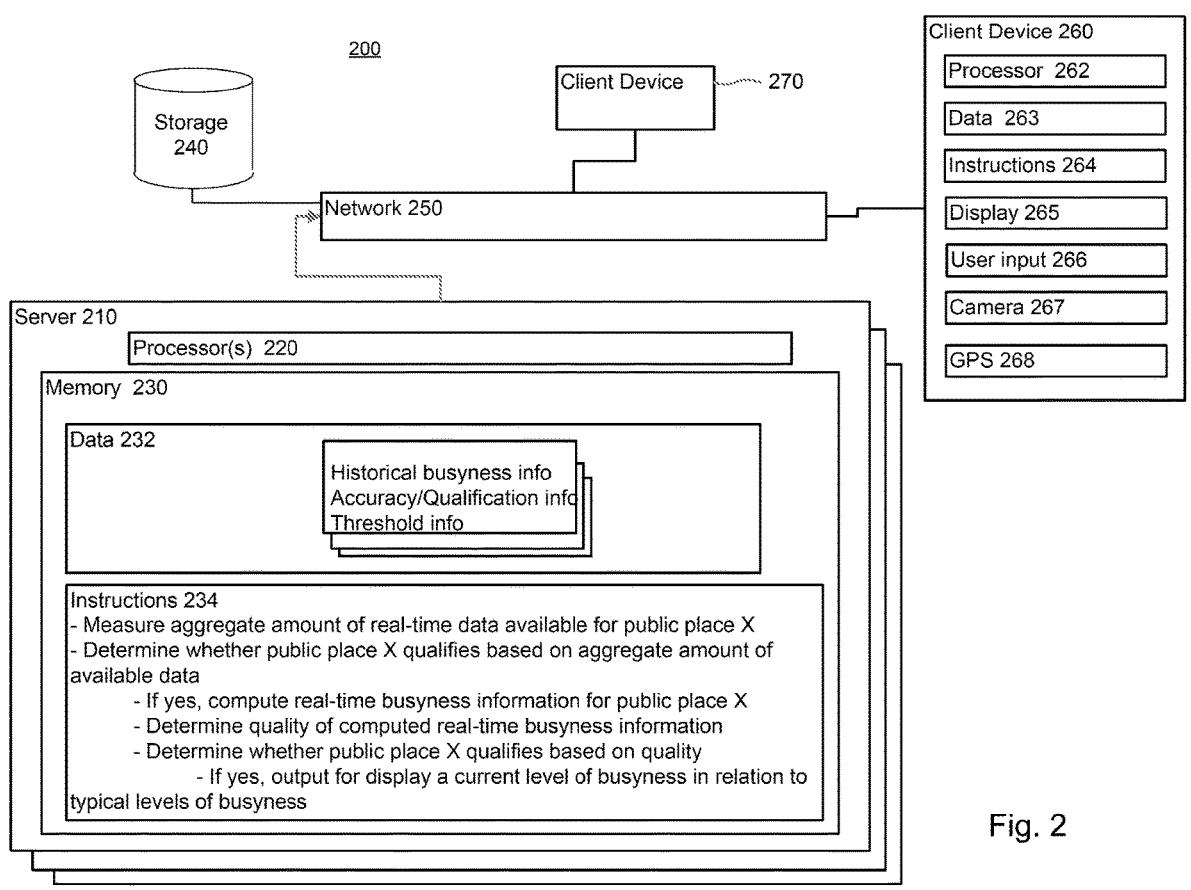
FIG. 2 is an example block diagram illustrating an example system used to qualify, compute, and display the current busyness levels.

FIG. 2 illustrates an example system used to qualify, compute, and display the current busyness levels. It should not be considered as limiting the scope of the disclosure or usefulness of the features described herein. In this example, system 200 can include computing devices 210 in communication with one or more client devices 260, 270, as well as storage system 240, through network 250. Each computing device 210 can contain one or more processors 220, memory 230 and other components typically present in general purpose computing devices. Memory 230 of each of computing device 210 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 232 may be retrieved, stored or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 220 can be any conventional processors, such as a commercially available CPU. Alternatively, the processors can be dedicated components such as an application specific integrated circuit ("ASIC") or other hardware-based processor. Although not necessary, one or more of computing devices 210 may include specialized hardware components to perform specific computing processes, such as decoding video, matching video frames with images, distorting videos, encoding distorted videos, etc. faster or more efficiently.

Although FIG. 2 functionally illustrates the processor, memory, and other elements of computing device 210 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 260.

Each of the computing devices 210, 260, 270 can be at different nodes of a network 250 and capable of directly and indirectly communicating with other nodes of network 250. Although only a few computing devices are depicted in FIG. 2, it should be appreciated that a typical system can include a large number of connected computing devices, with each different computing device being at a different node of the network 250. The network 250 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 210 may include web servers capable of communicating with storage system 240 as well as computing devices 260, 270 via the network 250. For example, one or more of server computing devices 210 may use network 250 to transmit and present information to a user on a display, such as display 265 of computing device 260. In this regard, computing devices 260, 270 may be considered client computing devices and may perform all or some of the features described herein.

Each of the client computing devices 260, 270 may be configured similarly to the server computing devices 210, with one or more processors, memory and instructions as described above. Each client computing device 260, 270 may be a personal computing device intended for use by a user, and have all of the components normally used in connection with a personal computing device such as a central processing unit (CPU), memory (e.g., RAM and internal hard drives) storing data and instructions, a display such as display 265 (e.g., a monitor having a screen, a touch-screen, a projector, a television, or other device that is operable to display information), and user input device 266 (e.g., a mouse, keyboard, touch-screen, or microphone). The client computing device may also include a camera 267 for recording video streams and/or capturing images, speakers, a network interface device, and all of the components used for connecting these elements to one another. The client computing device 260 may also include a location determination system, such as a GPS 268. Other examples of location determination systems may determine location based on wireless access signal strength, images of geographic objects such as landmarks, semantic indicators such as light or noise level, etc.

Although the client computing devices 260, 270 may each comprise a full-sized personal computing device, they may alternatively comprise mobile computing devices capable of wirelessly exchanging data with a server over a network such as the Internet. By way of example only, client computing device 260 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen.

As with memory 230, storage system 240 can be of any type of computerized storage capable of storing information accessible by the server computing devices 210, such as a hard-drive, memory card, ROM, RAM, DVD, CD-ROM, write-capable, and read-only memories. In addition, storage system 240 may include a distributed storage system where data is stored on a plurality of different storage devices which may be physically located at the same or different geographic locations. Storage system 240 may be connected to the computing devices via the network 250 as shown in FIG. 1 and/or may be directly connected to any of the computing devices 210.

Storage system 240 may store data, such as historical busyness information for particular locations, accuracy information, quality information, thresholds, etc. For example, the busyness information for a popular business for a past number of months or years may be stored. Only geographic locations that have passed a privacy qualification are stored, such that increased privacy protection is afforded. For example, the geographic locations must have a number of logged visits above a predetermined threshold.

Using the stored data, the computing devices 110 may qualify a public place for computation of real-time busyness information. The qualification for the real-time busyness information may take place in multiple parts, such as a first qualification based on privacy and a second qualification based on accuracy.

Figure 3:
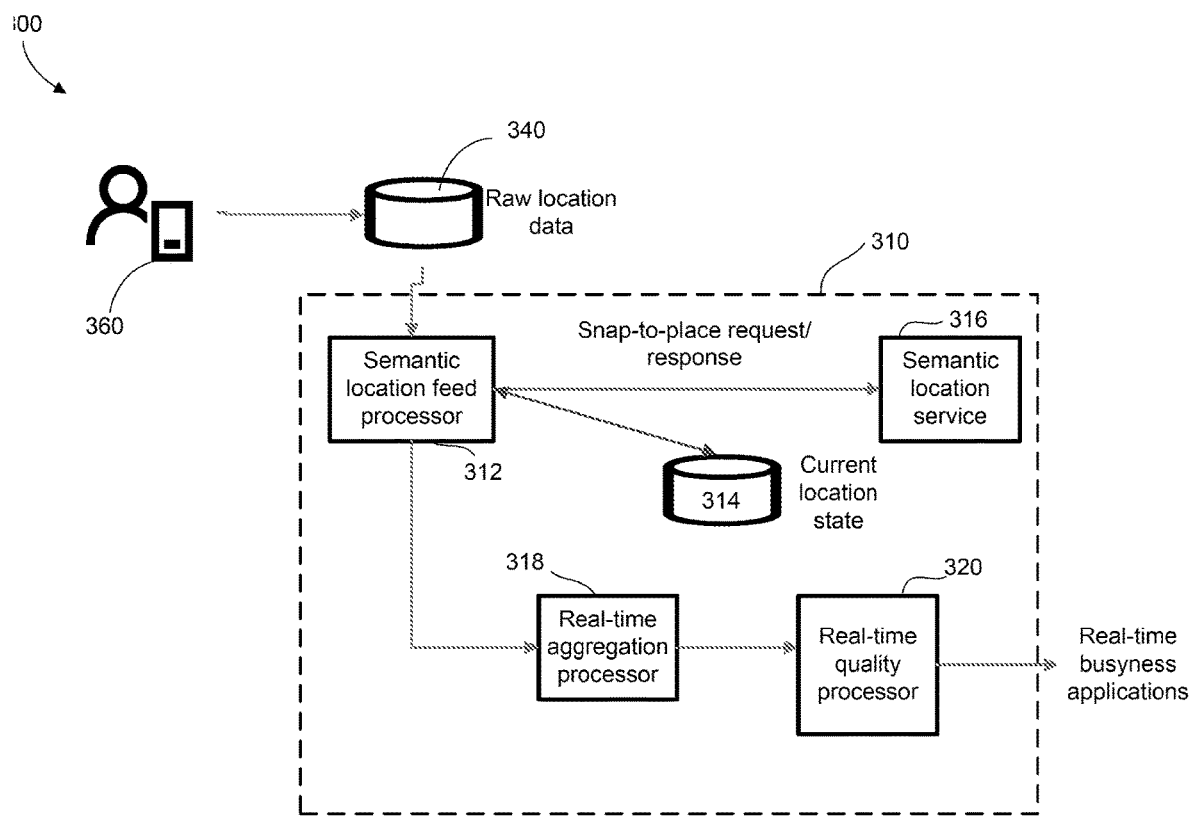
FIG. 3 is an example block diagram illustrating another example system used to qualify, compute, and display the current busyness levels.

FIG. 3 illustrates another example system 300 used to qualify, compute, and display the current busyness levels. As shown in this example, mobile device 360 provides information to a raw location database 340, which further provides information to computing system 310. Computing system 310 includes one or more components, such as processors and memory. For example, as shown in FIG. 3, the computing system 310 includes a semantic location feed processor 312, a semantic location service 316, a current location state database 314, a real-time aggregation processor 318, and a real-time quality processor 320.

The raw location data received at the database 340 from the mobile device 360 includes only information authorized by a user of the mobile device. For example, the user may adjust settings on the mobile device to allow or disallow providing information such as geographic coordinates or other location based information. Moreover, privacy protections are provided for any user data transmitted by the mobile device, including, for example, anonymization of personally identifiable information, aggregation of data, filtering of sensitive information, encryption, hashing or filtering of sensitive information to remove personal attributes, time limitations on storage of information, or limitations on data use or sharing. For example, detailed location information may only be stored for a relatively short-lived period of time in the database 340. Moreover, data may be anonymized and aggregated such that individual user data is not revealed. Rather than using any personal information to uniquely identify a mobile device, a hash of a unique identifier may be used. For example, the hash may be a cryptographic hash. The hash may have a high collision rate. The hash may be applied to a unique number or text string associated with mobile device. In this regard, no personal information is stored.

The semantic location feed processor 312 may be a streaming processor that consumes the raw location feed from the raw location database 340, and determines a current semantic location for each mobile device on each update. For example, each time the semantic location feed processor 312 receives location information for a mobile device, it may correlate the location information with an establishment. For example, if the received location information indicates that the mobile device is at coordinates (x, y), the semantic location feed processor 312 may determine that Business A is located at the coordinates (x,y) and therefore the mobile device is at Business A. In addition or alternative to using geographic coordinates, other location information may be used to determine the current semantic location, such as images of landmarks, wireless access received signal strength indicators, barometric pressure, noise level, light level, etc.

In determining the current semantic location, the semantic location feed processors 312 communicates with semantic location service 316 and current location state database 314. The semantic location service 316 may be a remote procedure call (RPC) service that supports multiple semantic location-related calls. For example, the semantic location feed processor 312 issues a "snap-to-place" request to the semantic location service 316. The semantic location feed processor 312 uses a response to the request to determine semantic location from raw latitude/longitude data. The current location state database 314 may store only locations that meet a privacy qualification. For example, the locations offered as a possible match to the raw location data may only include public places, such as businesses, parks, etc.

The semantic location feed processor 312 publishes the current semantic location for each mobile device to the real-time aggregation processor 318. The real-time aggregation processor 318 consumes the current semantic location feed published by the semantic location feed processor 312, aggregating visits by place, over time. For example, the real-time aggregation processor 318 may aggregate visits within a predetermined period of time, such as hours, days, weeks, months. In aggregating the visits, the processor 318 may use a data structure, such as a bit vector. By way of example only, a 128 bit vector may be populated with a new bit for each time a unique hash appears for Business A. A separate bit vector may be used for each different establishment. If a particular hash value appears more than once in a given time period, such as several minutes or an hour, it may be assumed that the hash represents the same device, and no additional bits are added to the vector for the additional appearance. For example, if the same device goes in and out of the Business A, it will only be counted once. The real-time aggregation processor 318 may be used to determine if a given location meets a privacy qualification. For example, if a predetermined portion of the bit vector for the Business A is filled within the predetermined time period, the Business A may meet a privacy threshold. By way of example only, if 65 bits of the 128 bit vector are filled within one day, the Business A may meet the privacy threshold. However, if an insufficient number of bits are filled, the Business A may be privacy disqualified and removed from the database 314. The real-time aggregation processor may produce a trace of real-time busyness that can be used to detect places that are unusually busy, or unexpectedly quiet. A density of reporting users can be used to infer real-time busyness of places, unexpected closures, unusual crowds, and other events.

According to one example, after a place is privacy qualified, the real-time busyness may be computed with a finer granularity. For example, an input may be a stream of {timestamp, hashed identifier, place-identifier} tuples, and an output may be a stream of {timestamp, place-identifier, delta} trigger events. The delta is how long it took to reach a threshold for the number of unique hashes seen. The shorter the trigger interval, the higher the number of people present. According to one example, a second bit vector is used per place being aggregated, wherein the second bit vector may be smaller than the first. For each hash identifier on the input, a single bit is set. When the configured threshold number of bits is set, a trigger event is generated for that place, and the bit vector is reset. Multiple appearances of the same identifier set the same bit, so that device will not be counted multiple times during one trigger interval. Different identifiers may set the same bit. The threshold then represents the minimum number of unique devices seen at that location. The expected number can be determined by simulation using random identifiers. For instance, for a threshold of 40 bits out of 64, there is a 99.3% chance that at least 50 unique identifiers were seen, and the expected number is 63.6. Using the above approach, identifiers are not retained and cannot be reconstructed, the same identifier will not be counted twice in the same interval, and the data structure is very compact.

The trigger interval for a place at a given time reflects the number of people who are there. More precisely, it measures the reporting rate of devices present who have location history reporting enabled. This may be proportional to an actual number of people present. Thus, for example, if the second bit vector is filled every 5 minutes before it needs to be reset, the place corresponding to the second bit vector may be assumed to be much busier than if the second bit vector was filled every 30 minutes.

Real-time quality processor 320 may be used to determine if the real-time data is quality/accuracy qualified. For example, the real-time data for a given place from the real-time aggregation processor 318 may be compared to historical data for the given place. Based on the comparison, a live occupancy percentage for places above some quality threshold is provided. According to one example of this second qualification, for each hour that the place (e.g., Business A) is open, a difference between the computed real-time busyness level and historical business levels is determined. For each hour where the difference is relatively low, such as below a predetermined threshold, the hour may be marked as "good." The predetermined threshold may be, for example, less than 20%-35% difference, or more or less. Likewise, for each hour where the difference is relatively high, such as above a predetermined threshold, the hour may be marked as "bad." The threshold difference for bad hours may be, by way of example only, above 60%, above 70%, above 80%, or the like. As a result, for a total number of hours in an evaluation period, some may be marked "good," some may be marked "bad," and some may be unmarked. An evaluation period may be, for example, a number of days, weeks, months, etc. According to one example, an evaluation period of approximately 2 weeks is used. If the number of "good" hours is above a predetermined percentage (e.g., 80% or 90%) of the total number of hours, and the number of "bad" hours is below a predetermined percentage (e.g., 2%, 5%, 15%, etc.) of the total number of hours, the real-time data may meet the second qualification and be considered accuracy qualified.

Although real-time busyness may be computed at a finer granularity, in some examples the data provided for output to a display is level across a longer span of time. For example, while real-time busyness may be computed every 5, 10, 15 minutes, etc., the output may be combined across a half-hour, hour, or some other longer time period. In this regard, some predictions may be used to supplement data from the very recent past. For example, for a real-time busyness query at 9:05 am, real-time data from 8:05-9:04 am is available, but an output includes predictions about occupancy of the place from 9-10 am. The need for prediction may depend on a structure of the output. For example, for a histogram depicting busyness levels for each hour, more prediction may be necessary than for a histogram or another display structure depicting busyness levels for shorter time periods.

Example Methods

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 4:
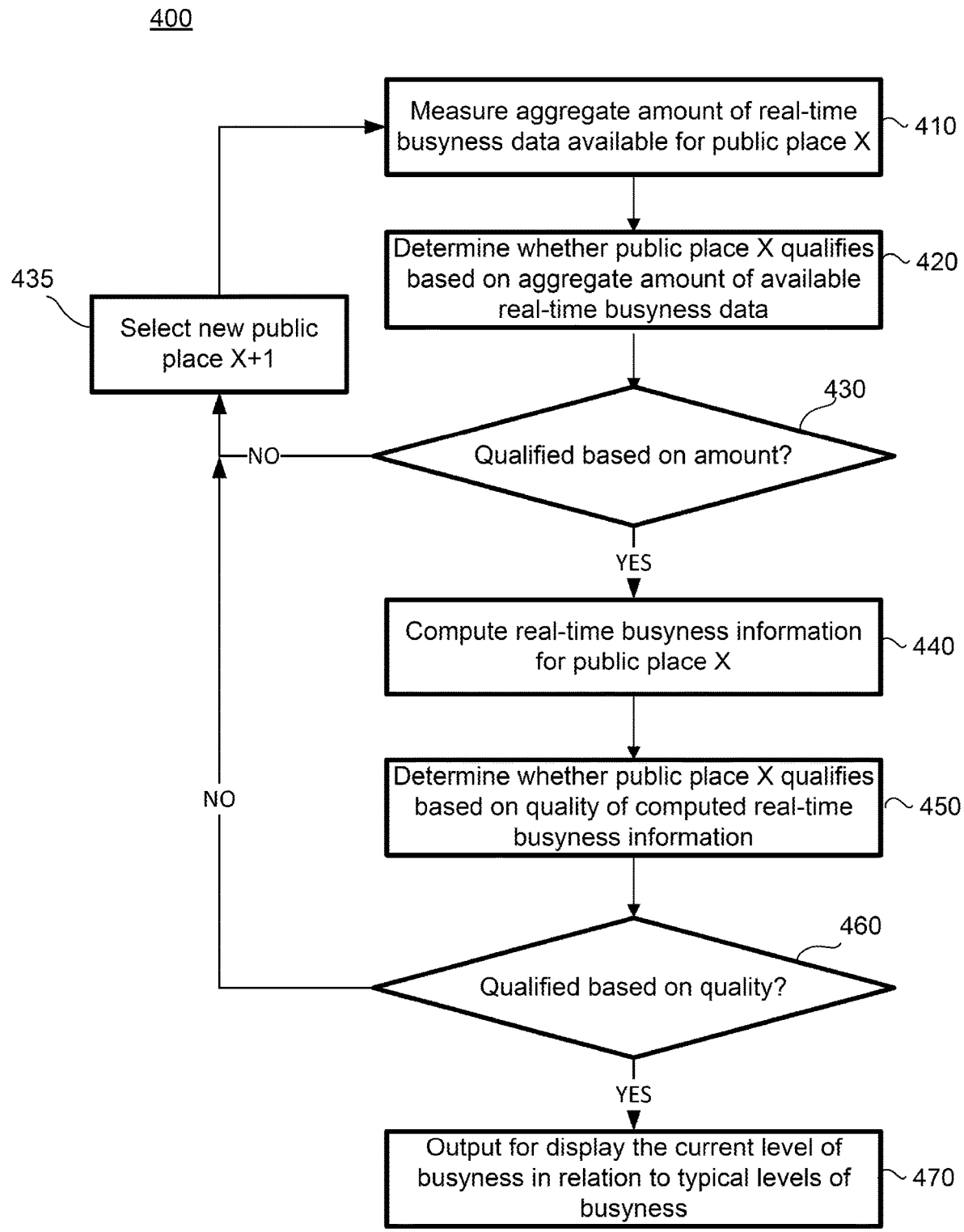
FIG. 4 is a flow diagram illustrating an example method of qualifying and providing the real-time busyness information.

FIG. 4 illustrates an example method 400 of qualifying and providing the real-time busyness information.

In block 410, an available amount of real-time busyness data is measured in aggregate for a given public place. The measuring may include determining a number of mobile devices present at a location of the given public place. For example, location information is authorized by a user of each device to be provided. The location information may be correlated with location information for businesses, parks, or other public places.

In block 420, it is determined whether the given public place is privacy qualified based at least in part on the amount of available real-time busyness data. For example, a place may meet a first qualification if an aggregate amount of available real-time busyness data meets or exceeds a predetermined threshold.

Regarding block 430, if the public place is privacy qualified, the method 400 proceeds to block 440, where the real-time busyness information is computed. For example, the real-time busyness information may be computed with a finer granularity, while still aggregating and anonymizing data to protect privacy. However, if the public place is privacy disqualified at block 430, it may be removed from a relevant database of candidate public places. Moreover, a new public place is selected in block 435 for analysis.

In block 450, it is determined whether the public place meets a second qualification, for example, related to accuracy. For example, the real-time busyness information may be compared to historical busyness information, which has known reliability. According to some examples, a confidence score may be computed based on the comparison. The confidence score may be compared to a predetermined threshold.

Regarding block 460, if it is determined that the real-time busyness data is accuracy-qualified, it may be provided for display or to another application in block 470. For example, the real-time busyness data may be provided for display in relation to the historical data for the given place, thus providing an indication of relative busyness. If the data is accuracy-disqualified, the public place may be ignored or removed from the database of candidate public places, and a new public place is selected in block 435. By removing disqualified places from the database, resources are conserved. Moreover, limiting the end results to those that are privacy-qualified and accuracy-qualified provides for an efficient use of network resources, such as bandwidth, as well as an improved end-user experience.

Figure 5:
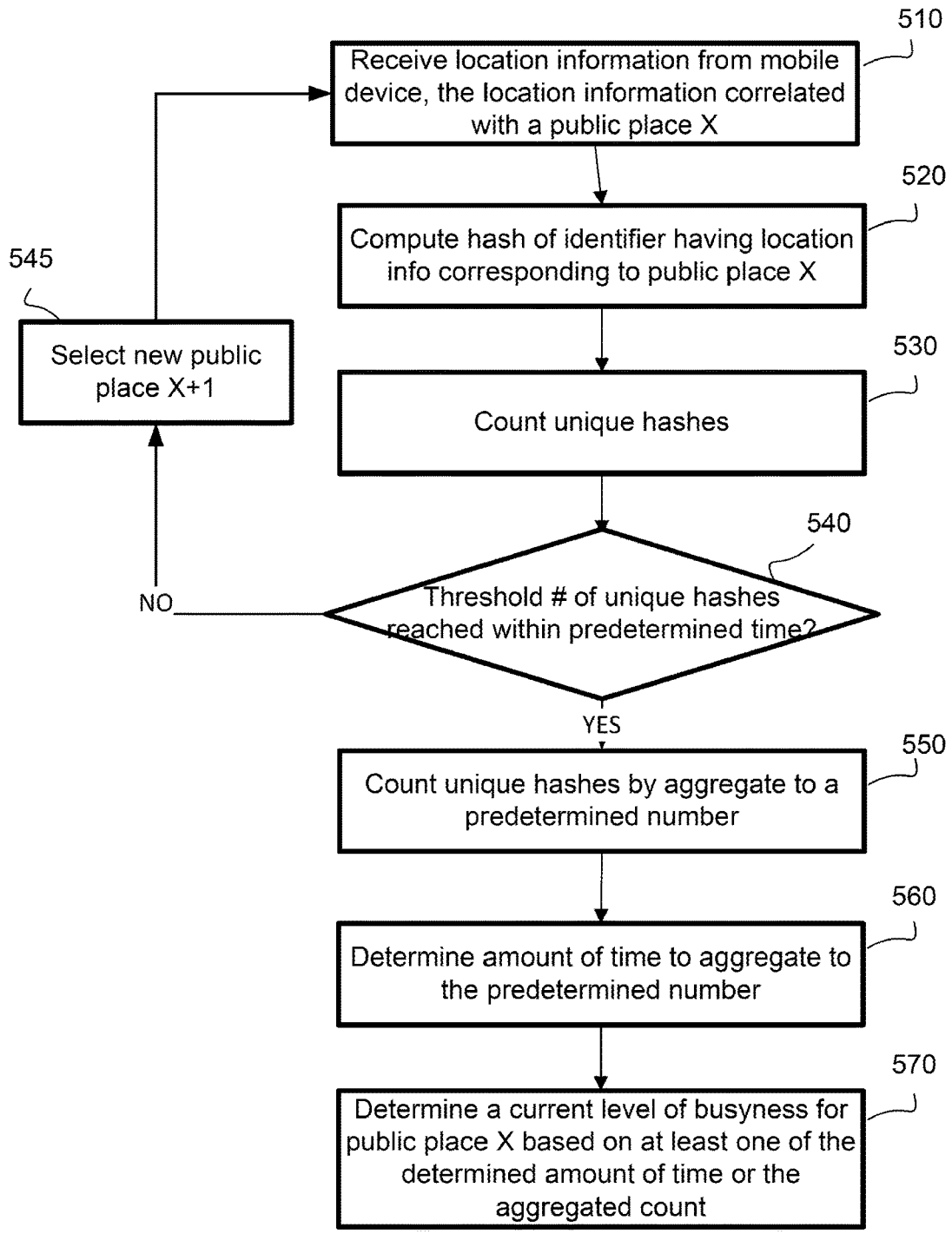
FIG. 5 is another flow diagram illustrating in more detail a method for aggregating data and determining if the first qualification is met for the public place.

FIG. 5 illustrates in more detail a method 500 for aggregating data and determining if the first qualification is met for the public place. For example, some of the operations in the method 500 may correspond to block 420 of FIG. 4. Other operations of the method 500 relate to determining the real-time busyness level for a place at a finer granularity than used for the initial determination of whether the public place is privacy-qualified.

In block 510, location information is received from mobile devices having a location corresponding to the given public place. Location information is only received from devices that have been set to allow for providing such information. The location information may include, for example, geographic coordinates or other information, which may be matched with geographic coordinates or other information for the public place.

In block 520, a hash of an identifier for each of the mobile devices at the public place is computed. For example, the hash may be a cryptographic hash with a high collision rate. The identifier may be unique to each mobile device or each user. While the identifier need not include personal information, by hashing the identifier, privacy is protected.

In block 530, a number of unique hashes is counted. For example, each unique hash may be considered to represent the presence of a person at the public place. Hashes that are duplicative or repetitive of previously counted hashes are not counted again, to avoid miscounting. In some examples, the unique hashes may be counted using a particular data structure, such as a bit vector. For example. for each unique hash that appears for the location, a bit may be entered in the bit vector.

In block 540, it is determined whether a threshold number of unique hashes are reached within a predetermined period of time. For example, for a particular place to meet privacy qualifications, it must be visited by a threshold number of users within a given time period. Referring to the example using the bit vector, a predetermined number of bits in the bit vector must be filled within a predetermined time to meet the qualification. By way of example only, if 90 unique hashes appear at the location over a 10-day period, the location may pass privacy qualifications. It should be understood that the number of hashes and the length of the period may be varied.

If the public place does not register the threshold number of unique hashes within the predetermined time period in block 540, it is privacy-disqualified and rejected. Thus, for example, it may be ignore or removed from relevant databases, and a new pubic place is selected in block 545.

However, if the public place meets the threshold in block 540, it is privacy qualified. Accordingly, the method proceeds to block 550. In block 550 and the following blocks, a real-time busyness level is computed for the public place. For example, the unique hashes may be re-counted by aggregate, but with a finer granularity. For example, a data structure such as a second bit vector may be used, wherein the second bit vector is smaller than the first bit vector. For example, the second bit vector may be 10 bits, 15 bits, 20 bits, etc. For each unique hash appearing at the location of the public place, a bit may be set in the second bit vector. When the second bit vector is filled, a trigger event may take place. When this occurs, the second bit vector may be emptied and reset.

In block 560, an amount of time required to aggregate to the predetermined number is determined. For example, the second bit vector may have been filled in 10 minutes, 30 minutes, 60 minutes, etc. In other examples, the second bit vector may have been filled, emptied, and refilled numerous times within the time interval.

In block 570, a current level of busyness for the public place is determined based on at least one of the aggregate count (block 550) or the determined amount of time (block 560). The current level of busyness may be provided as output.

FIG. 6 illustrates an example of how one or more time periods may be correlated with the aggregation of unique hashes in the second data structure. In computing how many devices are at a privacy-qualified place within a span of time, one factor may include a period of down time in which devices have arrived at the place but their unique hashes have not yet been received. This down time period may be approximated, for example, based on previous tests, or computed using other information, such as information related to access points near the place. In this particular example, a number of unique hashes are counted, for example, in batches. Each batch may include, for example, 5, 10, or any other number of unique hashes. Out of the total number of batches, it is determined how quickly the hashes were detected. For example, 25% of all the detected hashes for a given location were detected in less than 5 minutes, while 52% were detected in less than 10 minutes, and 74% were detected in less than 20 minutes. Computing busyness levels over a larger span of time, such as half an hour, an hour, etc., may reduce offsets in the actual busyness levels caused by the down time. In other examples, estimations or projections may factor in one or more values associated with an approximated down time.

Figure 7:
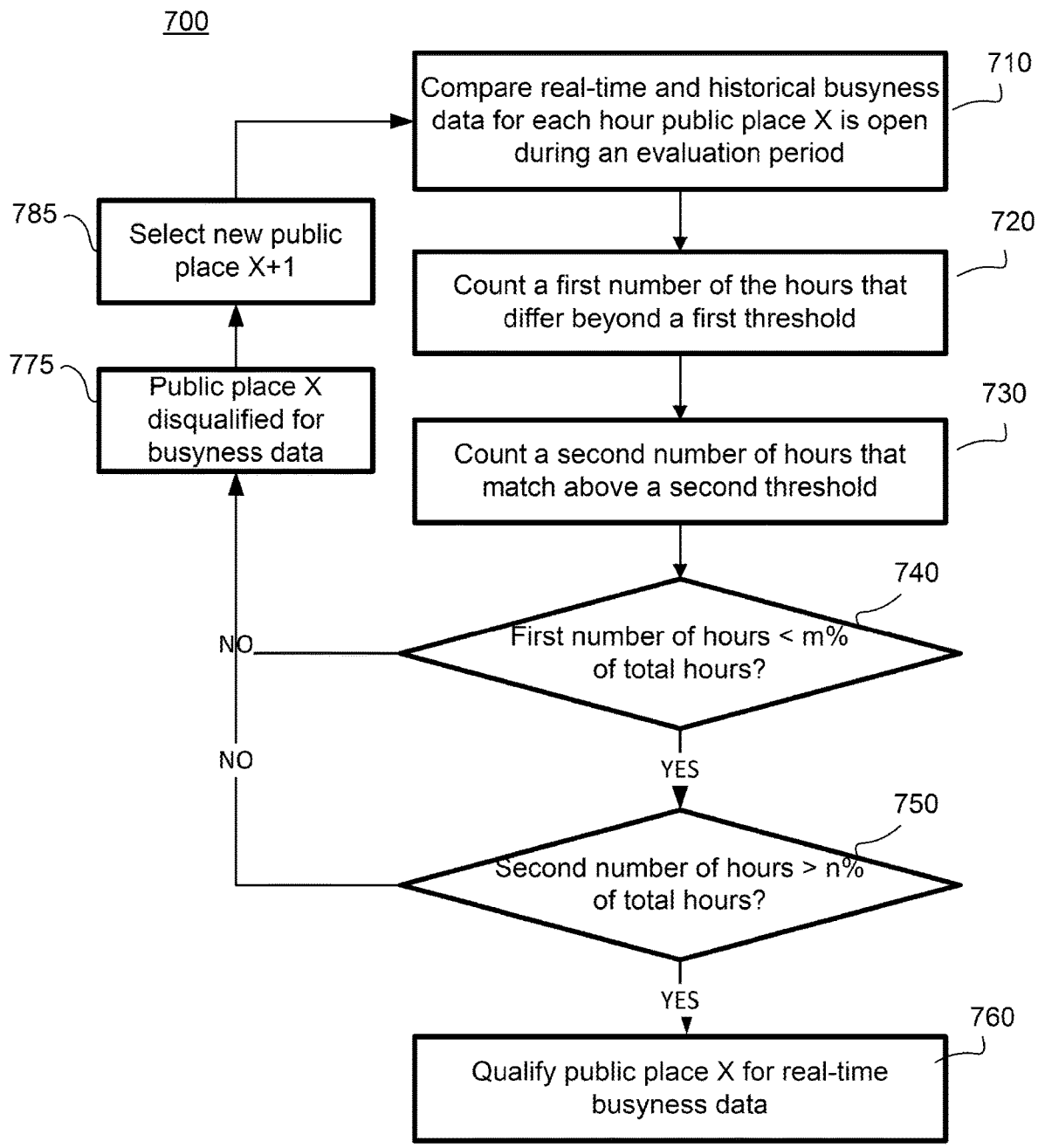
FIG. 7 is a flow diagram illustrating an example of how the real-time busyness information is qualified.

FIG. 7 illustrates an example of how the real-time busyness information is qualified. For example, some blocks of FIG. 7 may correspond to blocks 450-460 of FIG. 4, providing further detail.

In block 710, real-time and historical busyness data are compared for a given public place for each hour the public place is open during an evaluation period. The evaluation period may be, for example, a number of days or weeks or longer. The operating hours of the public place may be determined from, for example, map information. In other examples, the operating hours may be determined based on a pattern of appearances of unique hashes.

In block 720, based on the comparison, a first number of the hours are identified, wherein a difference between the real-time and historical information for each of the first number of the hours exceeds a first threshold. For example, the two sets of data may differ beyond 60% or more for a particular hour. In some examples, that particular hour may be labeled using some convention, such as a ranking or scoring system, or using text such as "mismatched," "bad," "unreliable" or the like.

In block 730, a second number of hours are counted, wherein for each of the second number of hours the real-time data matches the historical data above a second threshold. The second threshold may be different from the first threshold. For example, the second number of hours may match greater than 70%, 80%, etc., or may differ less than 10%, 20%, etc. It should be understood that the first and second thresholds may be varied. Similar to the first number of hours, each of the second number of hours may also be labeled according to a similar convention, such as a scoring value, text, etc.

In block 740, it is determined whether the first number of hours is less than a first predetermined percentage the total number of hours. For example, if the number of mismatched hours is less than 2% or 5% or some other relatively low percentage of the total number of hours, the method 700 may proceed to the next accuracy consideration. If not, however, the public place is disqualified (block 775) and a new public place is selected for analysis (block 785).

In block 750, it is determined whether the second number of hours is more than a second predetermined percentage of the total number of hours. For example, if the number of matching hours I more than 80% or 85% or some other relatively high percentage of the total number of hours, then the public place may be quality-qualified (block 760). If not, the method may return to block 775.

Figure 8:
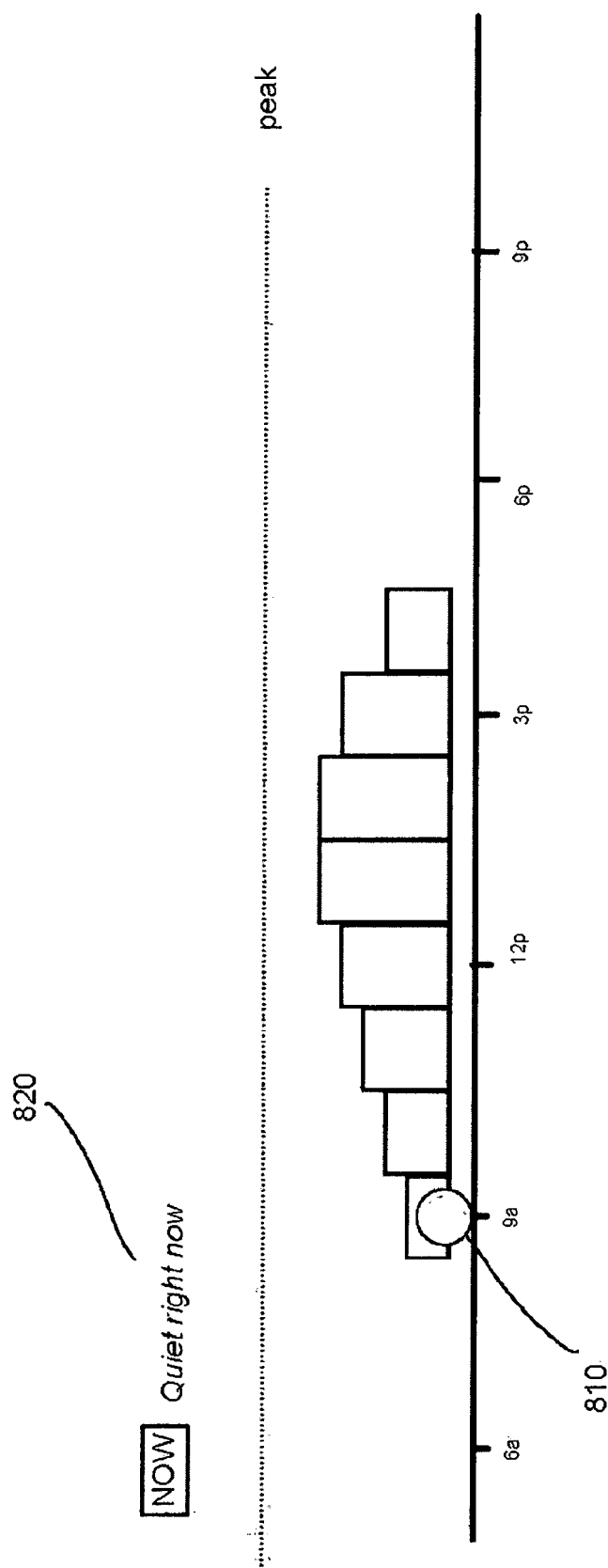
FIG. 8 illustrates an example display of the real-time data.

FIG. 8 illustrates an example display of the real-time data. As shown in this example, the displayed real-time busyness data is displayed relative to typical busyness levels, which may be derived from historical data. The current busyness level is shown as indicated by a glowing dot 810. Further provided is a text description 820 of how the current busyness level compares to typical busyness levels.

The concept allows real-time occupancy information for geographical venues to be determined and displayed in user devices. The determination of the real-time occupancy information is controlled in a manner which ensures that the information displayed at user devices is reliable. Furthermore, the determination of the real-time occupancy information is controlled in a manner which avoids unnecessary network traffic and minimises network disruption. This means that the real-time occupancy information is determined and delivered to user devices in a manner which is efficient in terms of its use of network resources.

For any particular venue, a confidence in real-time occupancy information may be determined in an off-network vetting process. The process may involve performing a comparison of past real-time location information for the venue, obtained from user devices, with historical occupancy information which is known to be accurate for the venue.

The vetting process may output a marker for each venue. The marker may be readable by devices in a main network and may indicate whether there is confidence in the real-time occupancy information for each venue. If, for a particular venue, the comparison referred to above shows a close match between occupancies determined from the past real-time location information and corresponding occupancies determined from historical location information, the confidence in the real-time occupancy information for the venue may be marked as high.

The confidence for each venue indicates to devices in the network whether ongoing real-time occupancy information for the venue is likely to be accurate. If the confidence in the real-time occupancy information for a particular venue is not high, the network may not request ongoing real-time occupancy information for the venue. This may contribute to the advantages discussed above in terms of minimising network traffic and network disruption.

For example, following the comparison process, ongoing real-time occupancy information for venues may be determined by obtaining live real-time device location information from a network computing apparatus, such as a location server. Such live device location information may be obtained, over the network, from the location server, only when it is known from the confidence marker that the real-time location information can be used to produce a reliable indication of live occupancy for the venue. Otherwise, the live information may not be requested over the network.

The process may continuously monitor the reliability of ongoing real-time occupancy information for each venue by comparing the ongoing real-time information with corresponding occupancy information determined from ongoing historical location information. Depending on the result of such monitoring, confidence in the real-time occupancy information for particular venues may change over time.

The concept ensures that real-time occupancy information can be continuously relied upon to be accurate when displayed to users at user devices. This reliability can have added advantages. For example, the concept may permit the safety of a particular venue to be improved by allowing the live occupancy of the venue to be monitored relative to the venue's legal maximum.

The concept allows real-time occupancy information for geographical venues to be determined and displayed in user devices. The determination of the real-time occupancy information is controlled in a manner which ensures that the information displayed at user devices is reliable. Furthermore, the determination of the real-time occupancy information is controlled in a manner which avoids unnecessary network traffic and minimizes network disruption. This means that the real-time occupancy information is determined and delivered to user devices in a manner which is efficient in terms of its use of network resources.

For any particular venue, a confidence in real-time occupancy information may be determined in an off-network vetting process. The process may involve performing a comparison of past real-time location information for the venue, obtained from user devices, with historical occupancy information which is known to be accurate for the venue.

The vetting process may output a marker for each venue. The marker may be readable by devices in a main network and may indicate whether there is confidence in the real-time occupancy information for each venue. If, for a particular venue, the comparison referred to above shows a close match between occupancies determined from the past real-time location information and corresponding occupancies determined from historical location information, the confidence in the real-time occupancy information for the venue may be marked as high.

The confidence for each venue indicates to devices in the network whether ongoing real-time occupancy information for the venue is likely to be accurate. If the confidence in the real-time occupancy information for a particular venue is not high, the network may not request ongoing real-time occupancy information for the venue. This may contribute to the advantages discussed above in terms of minimizing network traffic and network disruption.

For example, following the comparison process, ongoing real-time occupancy information for venues may be determined by obtaining live real-time device location information from a network computing apparatus, such as a location server. Such live device location information may be obtained, over the network, from the location server, only when it is known from the confidence marker that the real-time location information can be used to produce a reliable indication of live occupancy for the venue. Otherwise, the live information may not be requested over the network.

The process may continuously monitor the reliability of ongoing real-time occupancy information for each venue by comparing the ongoing real-time information with corresponding occupancy information determined from ongoing historical location information. Depending on the result of such monitoring, confidence in the real-time occupancy information for particular venues may change over time.

The concept ensures that real-time occupancy information can be continuously relied upon to be accurate when displayed to users at user devices. This reliability can have added advantages. For example, the concept may permit the safety of a particular venue to be improved by allowing the live occupancy of the venue to be monitored relative to the venue's legal maximum.

A computer-implemented method comprises accumulating location information from one or more user devices on a network, and assigning a data structure to a public location of interest and recording one or more indicators in the data structure, each indicator representing the presence of one or more users of the user devices at the location of interest, determined from the accumulated location information. The method further comprises recording occurrence of an occupancy event on recording a threshold number of indicators in the data structure, resetting the content of the data structure if an occupancy event is recorded, and determining a level of busyness of the location of interest from the rate of occurrence of occupancy events. According to this method, the location information may be accumulated in real-time in association with one or more unique identifiers of corresponding one or more devices. Moreover, the location information may be accumulated over a sliding temporal window in association with one or more unique identifiers of corresponding one or more devices.

The data structure may comprise a plurality of memory locations, each memory location arranged to accommodate an indicator, wherein on recording an indicator in the data structure, the memory location in which an indicator is to be recorded is determined in accordance with the identity of the corresponding device identified at the location of interest. Each memory location is associated with a set of devices, and on identifying the presence of a device in a set at the location of interest, an indicator is recorded at the corresponding memory location, such that no further indicator can be recorded at the same memory location if the presence of a device in the set is subsequently identified at the location of interest until the data structure is reset. The data structure may be a bit vector, wherein the size of the bit vector represents the number of the plurality of memory locations, and each memory location is configured to accommodate a bit, wherein an indicator corresponds to a bit having a predetermined one of two states. The method may further comprise applying a predetermined hash function to the unique identifier of a device on determining the presence of the device at the location of interest, wherein the size of the bit vector represents the range of values that can be generated by the predetermined hash function. The predetermined hash function may be cryptographic. The predetermined hash function may have a collision rate sufficiently high to represent the unique user identifiers in 128 hash values, the bit vector has a length of 128 bits, and the threshold number of indicators corresponds to ten bits. Further to any of the above examples. the method may further comprise recording the one or more indicators in a further bit vector, and resetting the content of the further bit vector on recording a further threshold number of indicators in the further bit vector, and qualifying the location of interest as a public location of interest on recording the further threshold number of indicators in the further bit vector, wherein the further threshold number of indicators is larger than the threshold number of indicators of the data structure. The further bit vector may be reset after a predetermined time period elapses.

An apparatus comprises at least one processing apparatus, and at least one computer-readable memory, wherein the at least one memory contains computer-readable instructions which, when executed by the at least one processing apparatus, cause any of the above example methods to be performed.

A computer-implemented method comprises accessing geographic location data of a first type for a plurality of user devices, accessing geographic location data of a second type for a plurality of user devices, determining, from the geographic location data of the first type, for at least one predetermined previous time, at least one occupancy indicator for at least one venue, and determining, from the geographic location data of the second type, for at least one corresponding previous time, at least one expected occupancy indicator for the at least one venue. Further, the method comprises comparing the at least one occupancy indicator with the at least one expected occupancy indicator to determine a confidence in the at least one occupancy indicator for the at least one venue, and providing, for the at least one venue, a confidence result for the at least one occupancy indicator.

In some examples, the accessed geographic location data of the first type comprises geographic location data obtained from user devices over a previous time period. The accessed geographic location data of the second type may comprise post-processed geographic location data obtained from user devices over a previous time period. The post-processed geographic location data may comprise matches between device locations and venues based on at least one post-processing parameter.

Any of the example methods above may further include determining, based on the confidence result, whether to access, from at least one computing apparatus over a network, further geographic location data of the first type for a plurality of user devices to determine, for at least one further predetermined time, at least one further occupancy indicator for the at least one venue. The at least one computing apparatus may comprise at least one network server apparatus storing live geographic location data of the first type for a plurality of user devices in the network. Further, the method may include accessing, from the at least one computing apparatus over the network, the further geographic location data of the first type, and determining, from the further geographic location data of the first type, for the at least one further predetermined time, at least one further occupancy indicator for the at least one venue. The at least one further predetermined time may be a current time.

The method may further comprise causing the at least one further occupancy indicator for the at least one venue to be displayed in at least one user device. The method may further comprise causing at least one expected occupancy indicator for the at least one venue at the at least one further predetermined time to be displayed in the at least one user device simultaneously with the at least one further occupancy indicator. The method may further comprise comparing the at least one further occupancy indicator with at least one expected occupancy indicator for the at least one venue at the at least one further predetermined time to determine a confidence in the at least one further occupancy indicator for the at least one venue, and providing, for the at least one venue, a further confidence result for the at least one further occupancy indicator. The method may further comprise determining, based on the further confidence result, whether to access, from the at least one computing apparatus over the network, still further geographic location data of the first type to determine, for at least one still further predetermined time, at least one still further occupancy indicator for the at least one venue. The at least one still further predetermined time may be a time later than the at least one further predetermined time.

An apparatus comprises at least one processing apparatus, and at least one computer-readable memory, wherein the at least one computer-readable memory contains computer-readable instructions which, when executed by the at least one processing apparatus, cause any of the above methods to be performed.

A computer program comprising computer-readable instructions executable by at least one computing apparatus may perform any of the above methods.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, at one or more processors, a request for information about a particular public place;
computing a hash of an identifier uniquely assigned to a user at the particular public place;
setting a threshold number of hash values to be stored in a predetermined portion of a data structure for the particular public place;

measuring, using the one or more processors, an aggregate amount of real-time location information available for the particular public place, the measuring comprising:
    determining a number of unique hashes having location data that corresponds to the particular public place; and
    storing the number of unique hashes corresponding to location data in the predetermined portion of the data structure;
determining, with the one or more processors, whether the public place meets a first qualification based on privacy, wherein the first qualification is met when the aggregate amount of available real-time location information for the public place meets or exceeds a predetermined threshold, the determining comprising determining whether the threshold number of hash values for the public place is reached within a predetermined period of time, thereby minimizing an amount of real-time location information to be stored at any instant in time;
when the public place does not meet the first qualification, reducing an amount of information stored by removing from the predetermined portion of the data structure the stored unique hashes, thereby conserving resources;
when the public place meets the first qualification, generating, with the one or more processors, real-time busyness information for the public place based on the real-time location information;
determining whether the computed real-time busyness information meets a second qualification based on an accuracy of the real-time busyness information; and
providing for display, when the computed real-time busyness information meets the second qualification, the generated real-time busyness information for the particular public place in response to the request.

2. The method of claim 1, wherein determining whether the public place meets the first qualification based on the amount of available real-time location information further comprises:
    computing a hash of an identifier, the identifier uniquely assigned to a user at the particular public place;
    counting a number of unique hashes having location data that, within a predetermined period of time, corresponds to the particular public place; and
    determining, with the one or more processors, whether a threshold number of unique hashes for the public place are reached within the predetermined period of time.

3. The method of claim 2, wherein counting the number of unique hashes comprises filling a predetermined portion of a first data structure.

4. The method of claim 3, wherein the data structure is a first bit vector.

5. The method of claim 1, wherein computing the real-time busyness information for the public place comprises:
    aggregating the unique hashes within a second data structure; and
    determining, with the one or more processors, a duration of time during which the unique hashes were aggregated.

6. The method of claim 5, further comprising:
    emptying the second data structure each time it is filled; and
    counting a number of times the second data structure is emptied.

7. The method of claim 1, wherein determining whether the computed real-time busyness information meets the second qualification comprises comparing, over an evaluation period, the computed real-time busyness information for the public place to historical real-time busyness information for the public place for each hour that the public place was open during the evaluation period.

8. The method of claim 7, further comprising:
    counting a first number of hours that differ beyond a first threshold;
    counting a second number of hours that match beyond a second threshold;
    determining whether the first number of hours is less than a first predetermined percentage of the total open hours in the evaluation period; and
    determining whether the second number of hours is greater than a second predetermined percentage of the total open hours in the evaluation period.

9. The method of claim 1, further comprising providing for display historical busyness information for the public place, the historical information provided in relation to the real-time information.

10. A system, comprising:
    a memory; and
    one or more processors in communication with the memory, the one or more processors configured to:
    receive a request for information about a particular public place;
    compute a hash of an identifier uniquely assigned to a user at the particular public place;
    set a threshold number of hash values to be stored in a predetermined portion of a data structure for the particular public place;
    measure an aggregate amount of real-time location information available for the particular public place, comprising:
        determine a number of unique hashes having location data that corresponds to the particular public place; and
        store the number of unique hashes corresponding to location data in the predetermined portion of the data structure;
    determine whether the public place meets a first qualification based on privacy, wherein the first qualification is met when the aggregate amount of available real-time location information for the public place meets or exceeds a predetermined threshold, the determining comprising determining whether the threshold number of hash values for the public place is reached within a predetermined period of time, thereby minimizing an amount of real-time location information to be stored at any instant in time;
    when the public place does not meet the first qualification, reduce an amount of information stored by removing from the predetermined portion of the data structure the stored unique hashes, thereby conserving resources;
    when the public place meets the first qualification, generate real-time busyness information for the public place based on the real-time location information;
    determine whether the computed real-time busyness information meets a second qualification based on an accuracy of the real-time busyness information; and
    provide for display, when the computed real-time busyness information meets the second qualification, the generated real-time busyness information for the particular public place in response to the request.

11. The system of claim 10, wherein in determining whether the public place meets the first qualification based on the amount of available real-time location information, the one or more processors are further configured to:

compute a hash of an identifier, the identifier uniquely assigned to a user at the particular public place;

count a number of unique hashes having location data that, within a predetermined period of time, corresponds to the particular public place; and determine whether a threshold number of unique hashes for the public place are reached within the predetermined period of time.

12. The system of claim 11, wherein counting the number of unique hashes comprises filling a predetermined portion of a first data structure.

13. The system of claim 12, wherein the data structure is a first bit vector.

14. The system of claim 10, wherein in computing the real-time busyness information for the public place, the one or more processors are further configured to:

aggregate the unique hashes within a second data structure; and determine a duration of time during which the unique hashes were aggregated.

15. The system of claim 14, wherein the one or more processors are further configured to:

empty the second data structure each time it is filled; and count a number of times the second data structure is emptied.

16. The system of claim 10, wherein determining whether the computed real-time busyness information meets the second qualification comprises comparing, over an evaluation period, the computed real-time busyness information for the public place to historical real-time busyness information for the public place for each hour that the public place was open during the evaluation period.

17. The system of claim 16, wherein the one or more processors are further configured to:

count a first number of hours that differ beyond a first threshold;

count a second number of hours that match beyond a second threshold;

determine whether the first number of hours is less than a first predetermined percentage of the total open hours in the evaluation period; and determine whether the second number of hours is greater than a second predetermined percentage of the total open hours in the evaluation period.

18. The system of claim 10, wherein the one or more processors are further configured to provide for display historical busyness information for the public place, the historical information provided in relation to the real-time information.

19. A non-transitory computer-readable storage medium storing instructions executable by one or more processors for performing a method, comprising:

receiving a request for information about a particular public place;

computing a hash of an identifier uniquely assigned to a user at the particular public place;

setting a threshold number of hash values to be stored in a predetermined portion of a data structure for the particular public place;

measuring an aggregate amount of real-time location information available for the particular public place, the measuring comprising:

determining a number of unique hashes having location data that corresponds to the particular public place; and storing the number of unique hashes corresponding to location data in the predetermined portion of the data structure;

determining whether the public place meets a first qualification based on privacy, wherein the first qualification is met when the aggregate amount of available real-time location information for the public place meets or exceeds a predetermined threshold, the determining comprising determining whether the threshold number of hash values for the public place is reached within a predetermined period of time, thereby minimizing an amount of real-time location information to be stored at any instant in time;

when the public place does not meet the first qualification, reducing an amount of information stored by removing from the predetermined portion of the data structure the stored unique hashes, thereby conserving resources;

when the public place meets the first qualification, generating real-time busyness information for the public place based on the real-time location information;

determining whether the computed real-time busyness information meets a second qualification based on an accuracy of the real-time busyness information; and providing for display, when the computed real-time busyness information meets the second qualification, the generated real-time busyness information for the particular public place in response to the request.

* * * * *